United States Patent
Pelc

(10) Patent No.: US 10,107,962 B2
(45) Date of Patent: Oct. 23, 2018

(54) REDUCTION OF BACK REFLECTIONS

(71) Applicant: HEWLETT PACKARD ENTERPRISE DEVELOPMENT LP, Houston, TX (US)

(72) Inventor: Jason Pelc, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/549,157

(22) PCT Filed: Feb. 20, 2015

(86) PCT No.: PCT/US2015/016786
§ 371 (c)(1),
(2) Date: Aug. 5, 2017

(87) PCT Pub. No.: WO2016/133531
PCT Pub. Date: Aug. 25, 2016

(65) Prior Publication Data
US 2018/0011251 A1     Jan. 11, 2018

(51) Int. Cl.
*G02B 6/14*     (2006.01)
*G02B 1/11*     (2015.01)
(Continued)

(52) U.S. Cl.
CPC .................. *G02B 6/14* (2013.01); *G02B 1/11* (2013.01); *G02B 6/1228* (2013.01); *G02F 1/295* (2013.01);
(Continued)

(58) Field of Classification Search
CPC .......... G02B 6/14; G02B 1/11; G02B 6/1228; G02B 2006/1209; G02B 2006/12107; G02F 1/295
See application file for complete search history.

(56) References Cited

U.S. PATENT DOCUMENTS 5,282,080 A *  1/1994  Scifres ............... G02B 6/12007
                                                   359/344
6,920,160 B2 * 7/2005  Zeitner ..................... H01S 5/10
                                                   372/29.023
(Continued)

OTHER PUBLICATIONS

Hanfoug, R. et al., "A Multimode Interference Coupler with Low Reflections," (Research Paper), 2005, pp. 97-100, available at http://leosbenelux.org/symp05/s05p097.pdf.
(Continued)

*Primary Examiner* — Ryan Lepisto
(74) *Attorney, Agent, or Firm* — Tong, Rea, Bentley & Kim, LLC

(57) ABSTRACT

In the examples provided herein, an apparatus has a mode converter coupled to a first waveguide to convert light propagating in a first set of spatial modes along the first waveguide to a second set of spatial modes. The apparatus also has a second waveguide coupled to the mode converter, where the second set of spatial modes propagate along the second waveguide in a first direction away from the mode converter. Further, the apparatus includes a coupler to couple a portion of the light propagating in the second set of spatial modes out of the second waveguide. Additionally, the second waveguide has an end facet away from the mode converter to reduce back reflection of the light not coupled out of the second waveguide to the first waveguide.

12 Claims, 5 Drawing Sheets

(51) Int. Cl.
    *G02B 6/122*   (2006.01)
    *G02F 1/295*   (2006.01)
    *G02B 6/12*    (2006.01)

(52) U.S. Cl.
    CPC ............... *G02B 2006/1209* (2013.01); *G02B 2006/12107* (2013.01)

(56) References Cited

U.S. PATENT DOCUMENTS

| | | |
|---|---|---|
| 6,973,232 B2 | 12/2005 | Betty et al. |
| 8,280,207 B2 | 10/2012 | Pinguet et al. |
| 8,885,677 B1 | 11/2014 | Kupershmidt et al. |
| 9,620,931 B2 * | 4/2017 | Tanaka ................. G02B 6/1228 |
| 2002/0159693 A1 | 10/2002 | Wolak et al. |
| 2006/0001183 A1 | 1/2006 | Nguyen et al. |
| 2006/0188204 A1 | 8/2006 | Fidric |
| 2009/0290837 A1 | 11/2009 | Chen et al. |
| 2013/0051727 A1 | 2/2013 | Mizrahi et al. |
| 2014/0010498 A1 | 1/2014 | Verslegers et al. |

OTHER PUBLICATIONS

International Search Report & Written Opinion received in PCT Application No. PCT/US2015/016786, dated Nov. 16, 2015, 11 pages.

\* cited by examiner

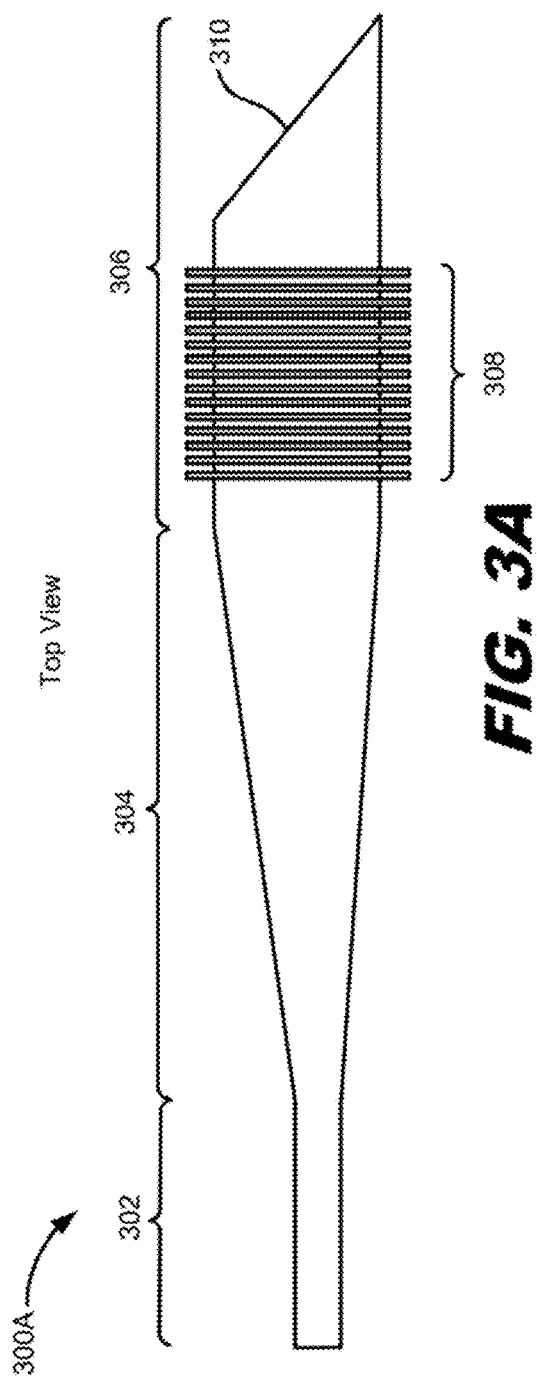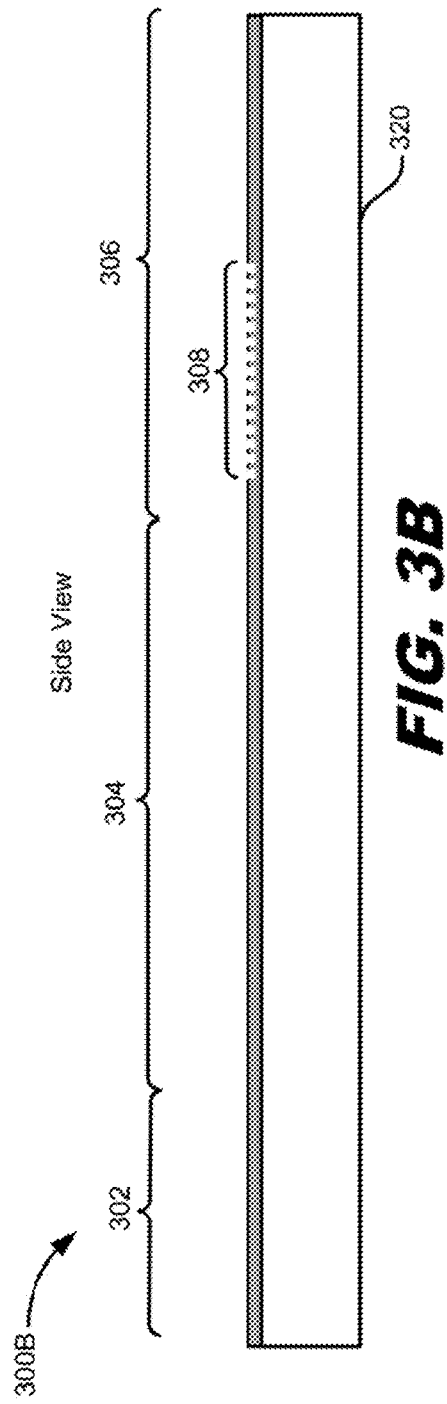

REDUCTION OF BACK REFLECTIONS

STATEMENT OF GOVERNMENT INTEREST

This invention was made with government support under N66001-12-2-4007 awarded by SPARWAR Systems Center Pacific. The government has certain rights in the invention.

BACKGROUND

A back reflection may occur when light from an optical source propagates along a waveguide and is reflected back toward the optical source at the interface of the end of the waveguide and another medium, such as air. Back-reflected optical signals in optical waveguides may cause deleterious effects, such as destabilization of a source laser or splitting of resonances in optical ring resonators.

BRIEF DESCRIPTION OF THE DRAWINGS

The accompanying drawings illustrate various examples of the principles described below. The examples and drawings are illustrative rather than limiting.

FIG. 3A depicts a top view of an example back-reflection reduction device. FIG. 3B depicts a side view of the example back-reflection reduction device.

DETAILED DESCRIPTION

Back-reflection reduction devices are presented below that aid in the reduction of back reflections occurring at a termination of a waveguide. A back-reflection reduction device is applicable to planar integrated optical waveguides that use a grating coupler to couple light off the integrated waveguide or into the integrated waveguide. Implementations of the device may be based upon an angled waveguide end facet that couples reflected light into different spatial modes from the spatial modes of the light that originally propagated along the waveguide to encounter the end facet.

Figure 1:
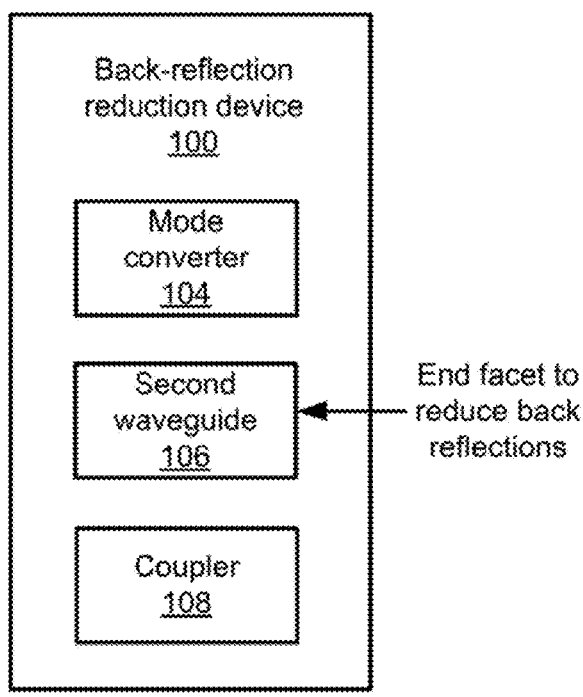
FIG. 1 depicts a block diagram of an example back-reflection reduction device.

FIG. 1 depicts a block diagram of an example back-reflection reduction device 100. The back-reflection reduction device 100 may include a mode converter 104, a second waveguide 106, and a coupler 108, where the second waveguide 106 is designed to have an end facet to reduce back reflections.

The mode converter 104 couples a first waveguide to a second waveguide 106 and converts one or more spatial modes propagating in the first waveguide to one or more spatial modes whose propagation is supported by the second waveguide 106. The first waveguide may be an optical waveguide that is part of a planar integrated photonic circuit which integrates two or more optical functions and may be fabricated on a substrate, such as silicon. The first waveguide may also be an optical fiber or other type of waveguide. In some implementations, the first waveguide may be a single mode waveguide that supports the propagation of a single spatial mode. Alternatively, the first waveguide may be a multimode waveguide that supports the propagation of multiple spatial modes.

Examples of mode converters 104 include tapered waveguides, such as adiabatically tapered waveguides, and a lens that focuses a light beam after expansion in a medium outside the waveguide, such as air. In some implementations, the mode converter 104 may be an adiabatically tapered waveguide. For example, the adiabatically tapered waveguide may convert a single spatial mode of a first waveguide, which may be a single mode waveguide, to the fundamental mode of the second waveguide 106, which may be a multimode waveguide. As another example, the adiabatically tapered waveguide may convert a first set of spatial modes of the first waveguide, which may be a multimode waveguide, to a second set of spatial modes of the second waveguide 106, which may be another multimode waveguide, and the second waveguide 106 may or may not be the same type of multimode waveguide as the first waveguide.

The second waveguide 106 is an optical waveguide that may be a multimode waveguide. Similar to the first waveguide, the second waveguide 106 may be part of an integrated photonic circuit, an optical fiber, or other type of waveguide. The end facet of the second waveguide 106 is designed to reduce back-reflections to the first waveguide. A smooth or polished end facet that is perpendicular to the direction of propagation of the light in the second waveguide 106 will cause the light to be reflected within the second waveguide 106 due to Fresnel reflections. For example, if light is propagating in the fundamental mode in the second waveguide 106, the reflected light will remain in the fundamental mode, traverse the mode converter 104 in the backward direction and couple back into the first waveguide. The reflected light may continue propagating backward, resulting in unwanted effects, such as destabilizing a laser source that initially generated the light. Types of end facets that may be used to reduce the back-reflected light are described below with reference to FIGS. 2A-2D.

The coupler 108 couples light out of the second waveguide 106. For example, if the second waveguide 106 were part of a planar integrated photonic circuit, the coupler 108 may couple light out from the second waveguide 106 and into, for example, an optical fiber for transmission to another location. As an example, the coupler 108 may be a grating coupler that is made of grooves etched in the second waveguide 106. Grating couplers may be advantageous with planar integrated photonic circuits because they may facilitate wafer-scale testing, eliminate polishing steps that may be expensive, reduce alignment tolerances, and reduce the cost of manufacturing because the grating coupler can couple light to the core of a cleaved single mode fiber, rather than coupling to more expensive tapered lensed fibers.

In general, a coupler 108, such as a grating coupler, is not perfectly efficient. As a result, light propagating along the second waveguide 106 is not entirely coupled out by the coupler 108. Light that is not coupled out by the coupler 108 continues to propagate along the second waveguide until it hits the end facet of the second waveguide 106.

The end facet of the second waveguide 106 may be designed to reduce back reflections into the same spatial modes that originally propagated along the second waveguide 106 toward the end facet. FIGS. 2A-2D depict side views of example portions of the second waveguide 106 having various end facets to reduce back reflections to the first waveguide.

Figure 2B:
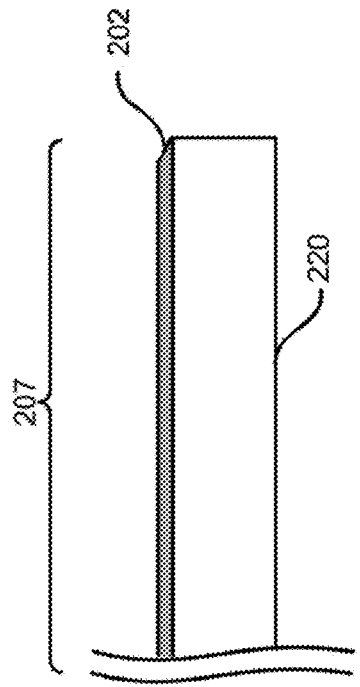
FIGS. 2A-2D depict side views of various end facets of a waveguide used in a back-reflection reduction device.
Figure 2D:
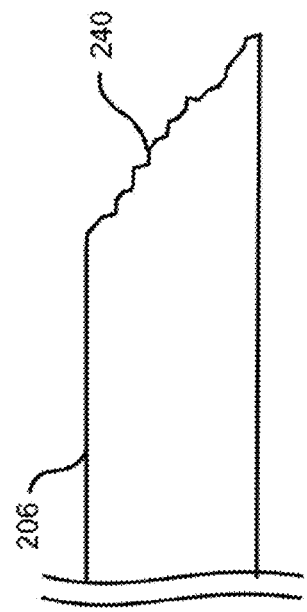
Figure 2A:
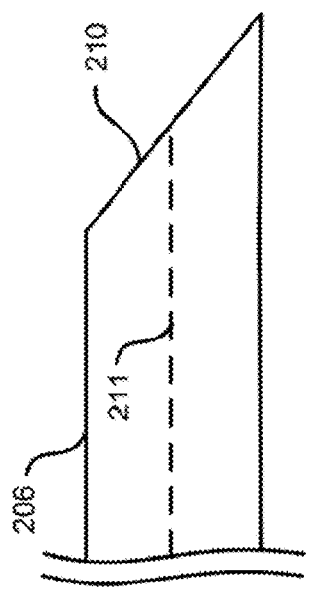

FIG. 2A depicts an example second waveguide 206 having an end facet 210 that is flat and angled with respect to the optical axis 211 of the second waveguide 206. Light that is not coupled out of the second waveguide 206 by the coupler 108 propagates to and hits the angled end facet 210 and is subsequently reflected at an angle from the incident direction to propagate in the backward direction. Thus, the back reflected light does not propagate backward in the same spatial modes as upon arrival at the angled end facet 210, rather the light propagates in different spatial modes back toward the mode converter 104. However, because the light is no longer propagating in the same spatial modes as it was after it traversed the mode converter 104 the first time, the mode converter 104 will not convert the back-reflected light into the original set of spatial modes that originally propagated along the first waveguide.

FIG. 2B depicts a side view of an example second waveguide 207 that is a planar integrated optical waveguide fabricated on a substrate 220. The second waveguide 207 may have an end facet 202 that is flat and angled in a direction out of a plane defined by a surface plane of the planar integrated optical waveguide. The angle of the end facet 202 performs the same function as the angle of the end facet 202 when it is in the plane of the surface plane of the second waveguide 206 as described above with reference to FIG. 2A.

Figure 2C:
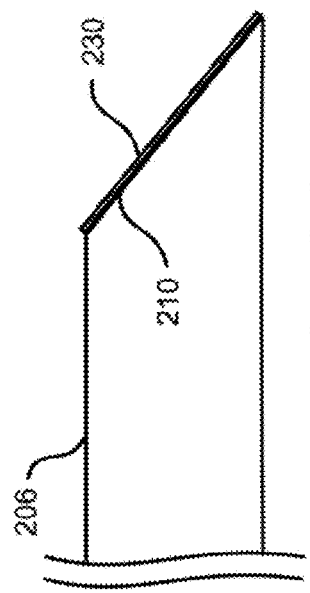

FIG. 2C depicts an example second waveguide 206 with an end facet 210 that has an anti-reflection coating 230. The anti-reflection coating 230 is designed to be effective at the wavelengths of the light propagating in the second waveguide 206. The anti-reflection coating 230 may be applied to the end facet 210 of the second waveguide 206 for any configuration of the end facet 210, for example, for any angle in any plane. Although anti-reflection coatings are not perfect, the anti-reflection coating 230 serves to reduce the amount of light reflected in the backward direction along the second waveguide 206, and thus, further reduces any light that couples back into the first waveguide.

FIG. 2D depicts an example second waveguide 206 with an end facet that has a rough surface 240. The rough surface 240 spoils the reflection of the light propagating along the second waveguide 206 by reflecting different portions of the light in different directions and into different spatial modes of the second waveguide 206. Alternatively, the end facet of the second waveguide 206 may have a curved surface, such as a parabolic surface, where the curvature of the surface may be in any plane or combination of planes. The effect is to reduce the amount of light that propagates back into the first waveguide (not shown in FIG. 2D) at the original spatial modes in which the light propagated along the first waveguide.

FIG. 3A depicts a top view 300A of an example back-reflection reduction device for planar integrated optical waveguides, and FIG. 3B depicts a side view 300B of the example back-reflection reduction device for planar integrated optical waveguides.

The back-reflection reduction device shown in 300A and 300B is a planar integrated optical device that has a first waveguide 302, a mode converter 304, and a second waveguide 306. In some implementations, the first waveguide 302 may be a single mode integrated optical waveguide along which light propagates; the mode converter 304 may be an adiabatically tapered integrated optical waveguide coupling the single mode waveguide to a multimode waveguide to convert the light in the single mode waveguide to a fundamental mode of the multimode waveguide; and the second waveguide 306 may be the multimode integrated optical waveguide along which the converted light propagates in the fundamental mode. Further, the back-reflection reduction device has a grating coupler 308 to couple the light in the fundamental mode out of the multimode waveguide 306.

The multimode waveguide has an end facet 310 away from the adiabatically tapered waveguide to reduce back reflection of light in the fundamental mode. Thus, light not coupled out of the second waveguide 306 by the grating coupler 308 hits the end facet 310 and is reflected into a different set of spatial modes from the fundamental mode. The light in the different set of spatial modes then propagates in the backward direction along the second waveguide 306. The mode converter 304 converts the backward propagating light into higher order modes that are not supported by the first waveguide 302. As a result, the light reflected from the end facet 310 may couple to unsupported cladding modes and dissipate after a short propagation distance.

In some implementations, the end facet 310 may be angled in a direction out of a plane defined by the second waveguide 306, have an anti-reflection coating at wavelengths of the light, and/or have a rough surface.

Figure 4:
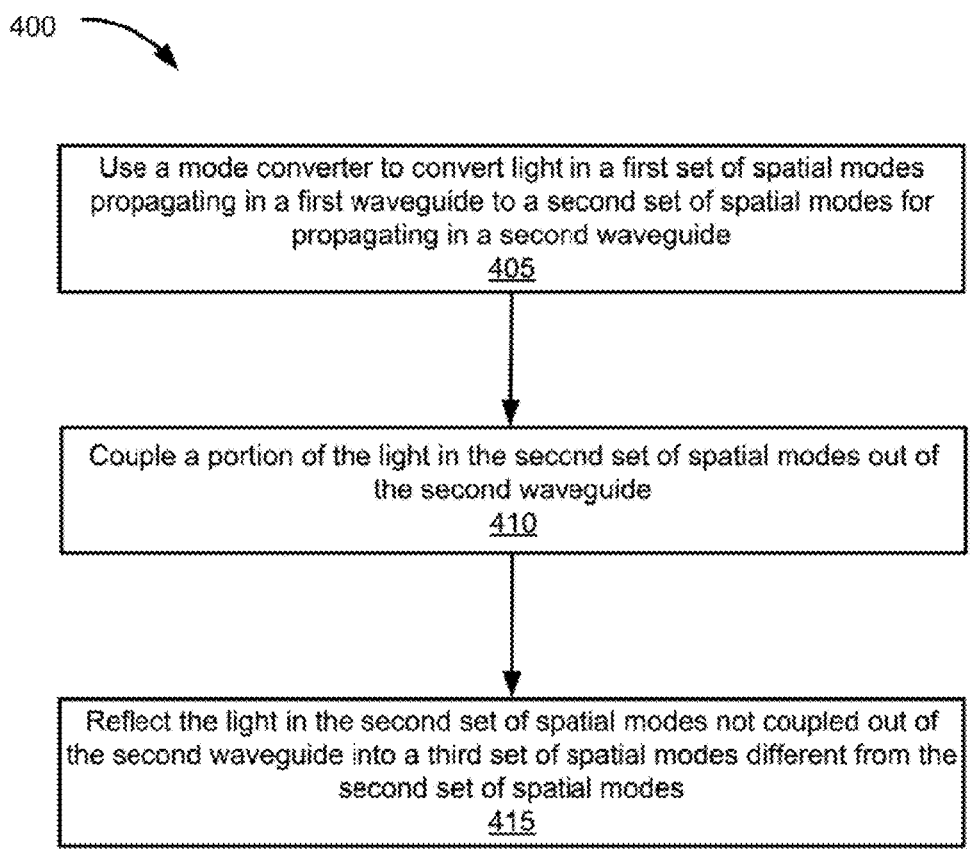
FIG. 4 depicts a flow diagram illustrating an example process of reducing back reflections in a waveguide.

FIG. 4 depicts a flow diagram illustrating an example process 400 of reducing back-reflections in a waveguide. The process begins at block 405 where a mode converter may be used to convert light in a first set of spatial modes propagating in a first waveguide to a second set of spatial modes for propagating in a second waveguide. For example, in some implementations, the first waveguide may be a single mode waveguide, and the second waveguide may be a multimode waveguide, where the second set of spatial modes may include the fundamental mode.

At block 410, a portion of the light in the second set of spatial modes may be coupled out of the second waveguide. For example, a grating coupler may be used to couple the portion of the light in the second set of spatial modes out of the second waveguide.

At block 415, the light in the second set of spatial modes not coupled out of the second waveguide may be reflected into a third set of spatial modes different from the second set of spatial modes. For example, light in the fundamental mode of the second waveguide may be reflected into higher order modes of the second waveguide.

Figure 5:
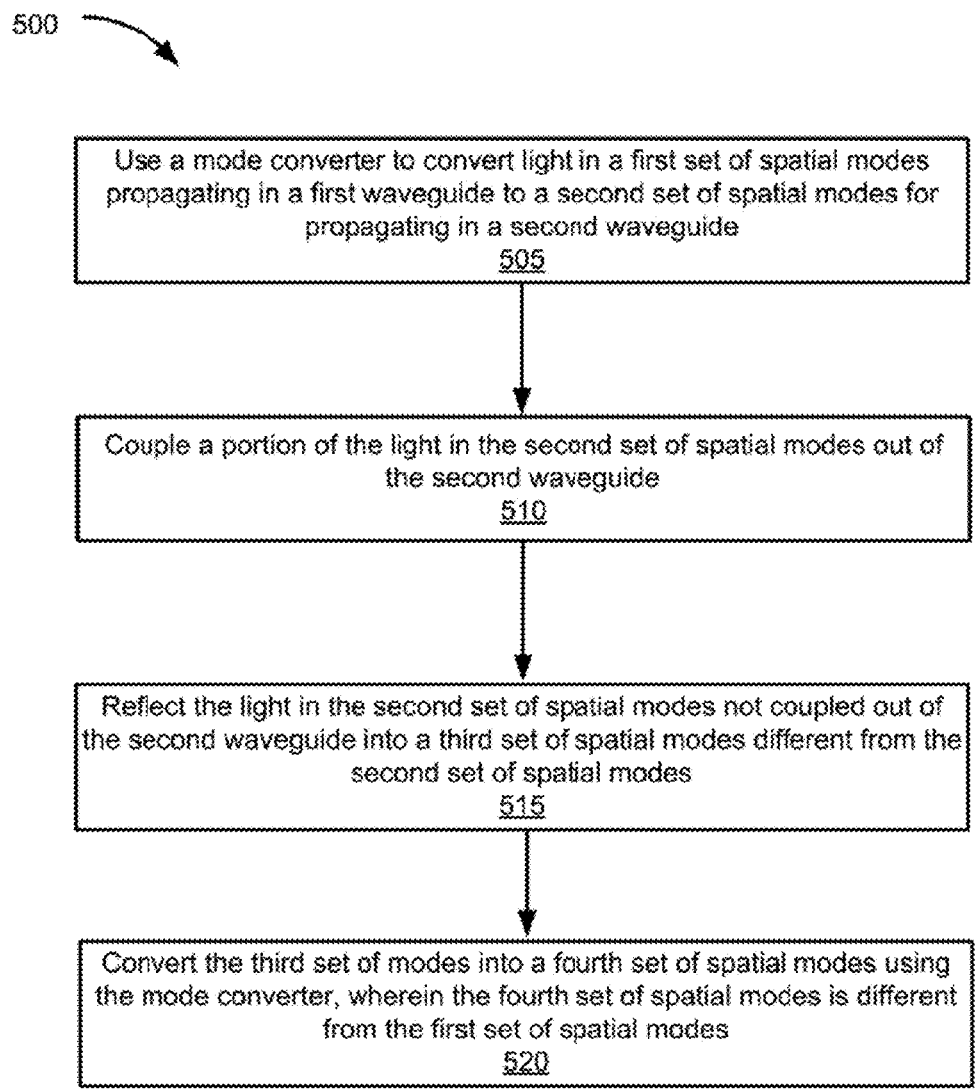
FIG. 5 depicts a flow diagram illustrating an example process of reducing back reflections in a waveguide.

FIG. 5 depicts a flow diagram illustrating an example process 500 of reducing reflections in a waveguide. The process begins at block 505, which may be similar to block 405 described with respect to the process 400 of FIG. 4. Blocks 510 and 515 may also be similar to blocks 410 and 415, respectively, of FIG. 4.

At block 520, the third set of spatial modes may be converted into a fourth set of spatial modes using the mode converter, where the fourth set of spatial modes is different from the first set of spatial modes. For example, the fourth set of spatial modes may be higher order spatial modes that are not supported by the first waveguide. Thus, light may be converted into the higher order spatial modes of the first waveguide, and if the first waveguide is a single mode waveguide, the light does not propagate very far in the first waveguide.

Not all of the steps, or features presented above are used in each implementation of the presented techniques.

As used in the specification and claims herein, the singular forms "a," "an," and "the" include plural referents unless the context clearly dictates otherwise.

What is claimed is:

1. An apparatus comprising:
   a mode converter coupled to a first waveguide to convert light propagating in a first set of spatial modes along the first waveguide to a second set of spatial modes;

a second waveguide coupled to the mode converter, wherein the second set of spatial modes propagate along the second waveguide in a first direction away from the mode converter; and a coupler to couple a portion of the light propagating in the second set of spatial modes out of the second waveguide, wherein the second waveguide has an end facet away from the mode converter to reduce back reflection by changing a spatial mode of a portion of the light that is reflected in a backward direction towards the first waveguide, wherein the end facet is at an angle to a perpendicular direction to an optical axis of the second waveguide.

2. The apparatus of claim 1, wherein the end facet is flat.

3. The apparatus of claim 2, wherein the end facet has an anti-reflection coating at wavelengths of the light.

4. The apparatus of claim 1, wherein the end facet is a rough surface or curved surface.

5. The apparatus of claim 1, wherein the first waveguide is a single mode waveguide, and further wherein the second waveguide is a multimode waveguide, and the second set of spatial modes is a fundamental mode.

6. An apparatus comprising:

a single mode integrated optical waveguide along which light propagates;

an adiabatically tapered integrated optical waveguide coupling the single mode integrated optical waveguide to a multimode integrated optical waveguide to convert the light in the single mode integrated optical waveguide to a fundamental mode of the multimode integrated optical waveguide;

the multimode integrated optical waveguide along which the light that is converted propagates in the fundamental mode; and a grating coupler to couple the light that is converted in the fundamental mode out of the multimode integrated optical waveguide, wherein the multimode integrated optical waveguide has an end facet away from the adiabatically tapered waveguide to reduce back reflection by changing a spatial mode of a portion of light that is reflected in a backward direction towards the single mode integrated optical waveguide, wherein the end facet is angled in a direction in a plane, or out of the plane, defined by the multimode integrated optical waveguide.

7. The apparatus of claim 6, wherein the end facet has an anti-reflection coating at wavelengths of the light.

8. The apparatus of claim 6, wherein the end facet is a curved surface or rough surface.

9. A method comprising:

using a mode converter to convert light in a first set of spatial modes propagating in a first waveguide to a second set of spatial modes for propagating in a second waveguide;

coupling a portion of the light in the second set of spatial modes out of the second waveguide; and reflecting a portion of the light in the second set of spatial modes not coupled out of the second waveguide into a third set of spatial modes different from the second set of spatial modes in a backward direction towards the first waveguide via an angled facet at an end of the second waveguide away from the first waveguide.

10. The method of claim 9, further comprising:

converting the third set of spatial modes into a fourth set of spatial modes using the mode converter, wherein the fourth set of spatial modes is different from the first set of spatial modes.

11. The method of claim 10, wherein the fourth set of spatial modes propagate in the first waveguide in an opposite direction from the first set of spatial modes.

12. The method of claim 9, wherein a coupler is used to couple the portion of the light in the second set of spatial modes out of the second waveguide, and the method further comprising coupling a portion of the light in the third set of spatial modes out of the second waveguide using the coupler.

* * * * *